(12) United States Patent
Chan et al.

(10) Patent No.: US 8,711,235 B2
(45) Date of Patent: Apr. 29, 2014

(54) IMAGE STABILIZATION

(75) Inventors: Danny Chan, Berlin (DE); Horst Knoedgen, Munich (DE)

(73) Assignee: RPX Corporation, San Francisco, CA (US)

( * ) Notice: Subject to any disclaimer, the term of this patent is extended or adjusted under 35 U.S.C. 154(b) by 484 days.

(21) Appl. No.: 13/068,650

(22) Filed: May 16, 2011

(65) Prior Publication Data

US 2012/0293671 A1 Nov. 22, 2012

(51) Int. Cl.
   *H04N 5/228* (2006.01)
(52) U.S. Cl.
   USPC ........................................ 348/208.5
(58) Field of Classification Search
   USPC .............. 348/208.99, 208.2, 208.4, 208.7, 348/208.11
   See application file for complete search history.

(56) References Cited

U.S. PATENT DOCUMENTS

| | | | |
|---|---|---|---|
| 6,064,827 A * | 5/2000 | Toyoda | 396/55 |
| 7,630,619 B2 | 12/2009 | Masuda | |
| 7,783,179 B2 * | 8/2010 | Takahashi | 396/55 |
| 7,957,631 B2 | 6/2011 | Chang | |
| 8,014,658 B2 * | 9/2011 | Huang | 396/55 |
| 8,059,158 B2 * | 11/2011 | Shirono | 348/208.7 |
| 8,139,291 B2 * | 3/2012 | Nakamura et al. | 359/557 |
| 8,320,753 B2 * | 11/2012 | Lee et al. | 396/55 |
| 2007/0236577 A1 * | 10/2007 | Ke et al. | 348/208.99 |
| 2010/0166401 A1 * | 7/2010 | Akutsu | 396/55 |
| 2011/0026908 A1 * | 2/2011 | Nishimura | 396/55 |
| 2011/0176012 A1 * | 7/2011 | Yagisawa | 348/208.2 |

* cited by examiner

*Primary Examiner* — James Hannett
(74) *Attorney, Agent, or Firm* — Howison & Arnott, L.L.P.

(57) ABSTRACT

A system to stabilize images of a digital camera adjusting to unintentional movements of the camera during capture of an image has been achieved. A gyroscopic sensor senses any movement of a camera by angular speed detection and via an electronic regulator at least two linear motors move an x-y table, carrying an optical sensor or a lens barrel of the camera, in a way to adjust the optical sensor to these movements. Position sensors, as e.g. sensors integrated in the linear motors, capacitive sensors, inductive sensors, or Hall sensors, sense the actual position of one or more movable plates of the x-y table and feed it back to the regulator. The movable plates of x-y table are guided by a multitude of rolling elements, e.g. ball bearings.

56 Claims, 4 Drawing Sheets

IMAGE STABILIZATION

BACKGROUND OF THE INVENTION (1) Field of the Invention

This invention relates generally to digital photography and relates more specifically to image stabilization system and methods to compensate for any movements as e.g. hand tremor when a photo is taken and an apparatus using the same.

(2) Description of the Prior Art

Image stabilization techniques or anti-shake technologies are employed in critical sceneries to reduce the effects of camera movements during image capture or to enable to prolong a maximum possible exposure time in digital photography. Typical usage scenarios are e.g. low light scenarios without a tripod with long exposure times required, environments with strong intrinsic movements (e.g. boats), image capture using telephoto lenses, or video applications.

It has to be noted that ergonomics of a camera influences in a vast extent the user's ability to make non-blurred images. Cameras built-in mobile phones or miniature cameras suffer from shaking more than normal-size cameras.

For typical applications in non-moving environments physiological tremor contributes mostly to hand shaking. Physiological tremor is present with all human beings, albeit it is also highly dependent upon the actual condition of an individual photographer. Typical amplitude of a physiological tremor is in the order of 0.5 to 1 degree. Typical frequencies of physiological tremor are in the range of 1 Hz up to 20 Hz, wherein the amplitudes are usually higher al lower frequencies leading to blurring of images captured.

There are two different approaches to optical image stabilization possible. A first approach is to move a single or multiple optical elements over a fixed sensor plate in order to offset the effect of the changing field of view due to hand shaking. A second approach is to move the optical sensor in response to the movement of the camera.

The second approach appears to yield the most promising results. It is a challenge for the designers of image stabilization systems to keep any dust from the moving optical sensor plate, to consider the issue of electrical connections between the moving optical sensor and to the fixed part of the camera, to minimize the reduction of the usable area of the moving optical sensor, and to minimize the impact of the movable optical sensor upon the size of a camera module.

Solutions dealing with image stabilization of cameras are described in the following patents:

U.S. Patent Application Publication (US 2007/0236577 to Ke et al.) teaches a system and method providing image stabilization in an image capture device. In one embodiment, a system includes a stationary base included in an image capture device. The system may also include a movable base positioned on top of the stationary base. A point contactor including a set of ball bearings is configured to be either connected to the stationary base such that the set of ball bearings contact a supporting module connected to the movable base such that the movable base moves in relation to the stationary base, or connected to the movable base such that the set of ball bearings contact a supporting module connected to the stationary base such that the movable base moves in relation to the stationary base.

U.S. Patent Application Publication (US 2007/0172220 to Masuda) discloses an image stabilization apparatus, which can provide enhanced accuracy of image stabilization. The apparatus includes a movable member movable relative to a fixed member of the apparatus, plural flexible members which movably support the movable member at least in a direction orthogonal to the optical axis, a portion of each of the flexible members on one end side in a direction along the optical axis being fixed to the fixed member, a portion of each of the flexible members on the other end side being fixed to the movable member, and an actuator which drives the movable member. The flexural rigidity of at least one of the plural flexible members in the direction orthogonal to the optical axis is different from that of the other at least one flexible member in that direction so as to suppress rotation of the movable member driven by the actuator.

U.S. Patent Application Publication (US 2008/0260368 to Chang) discloses an image stabilization apparatus for stabilizing an image sensor. The image stabilization apparatus includes a transmission component whereon a slot is formed. The image stabilization apparatus further includes a rotary motor including an annular rotor connected to the transmission component, and an annular stator disposed on a side of the annular rotor. The annular rotor is capable of rotating relative to the annular stator. The image stabilization apparatus further includes a carrier for carrying the image sensor. The carrier includes a shaft disposed inside the slot in a slidable manner. The image stabilization apparatus further includes a linear motor coupled to the transmission component and the shaft of the carrier for driving the carrier to slide inside the slot.

SUMMARY OF THE INVENTION

A principal object of the present invention is to achieve methods and systems to stabilize images during image capture by a digital camera by moving an image sensor in order to adjust to movements of the camera.

A further object of the present invention is to stabilize images during image capture using a simple mechanical system without extra position sensors.

A further object of the present invention is to stabilize images during image capture using linear motors to move an x-y table carrying the image sensor of the camera.

Furthermore an object of the present invention is to stabilize images during image capture using linear motors to move an x-y table carrying the lens barrel of the camera.

Moreover an object of the present invention is to use linear motors having an integrated position sensor to move the x-y table and control the actual position thereof.

A further object of the present invention is to move an x-y table, carrying an optical sensor of the camera, depending upon an output of a gyroscopic sensor detecting movements of the camera.

A further object of the present invention is to move the x-y table on balls by at least three linear motors.

Another object of the present invention is to allow angular movements of the x-y table, perpendicular to the optical axis of the camera.

In accordance with the objects of this invention a system to stabilize images of digital cameras by adjusting a part of the optical system of the camera to unintentional movements of the camera during capture of an image has been achieved. The system comprises, firstly, a gyroscopic sensor, sensing an angle speed of the camera, wherein an output of the gyroscopic sensor is an input to an electronic regulator, said electronic regulator controlling a position of a x-y table, carrying said part of the optical system to be adjusted, wherein said x-y table is moved by at least two linear motors dependent upon the input from said gyroscopic sensor, and wherein position sensors are providing information about an actual position of the x-y table to the electronic regulator. Furthermore the system invented comprises said x-y table comprising a movable top plate and a fixed bottom plate, wherein first parts of the linear motors are mounted to the top plate and second parts are mounted to the fixed bottom part, and said position sensors providing input to said electronic regulator.

In accordance with the objects of this invention a method to stabilize images of digital cameras by adjusting a part of the optical system of the camera to unintentional movements of the camera during capture of an image has been disclosed. The method invented comprises, firstly, the following steps: (1) providing a digital camera, wherein a part of the optical system of the camera is mounted on a movable x-y table, linear motors to move said part of the optical system, a regulator, a gyroscopic sensor, and position sensors, (2) activating the gyroscopic sensor any time before a picture is taken, and (3) sensing unintentional movements of the camera by said gyroscopic sensor and feed correspondent signals to the regulator. Furthermore the method comprises the steps of (4) activating said linear motors to move said part of the optical system in order to compensate unintentional movements of the camera, (5) controlling the movements of said part of the optical system by position sensors wherein actual positions are fed back to the regulator, and (6) taking a picture while unintentional movements of the camera have been compensated during capture of the picture at the same time.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to stabilize images during capture by a digital camera. The invention applies to still cameras as well as to video cameras. The movement of the camera during capture of an image is sensed by a gyroscopic sensor and, dependent upon the angle speed detected by the gyroscopic sensor, a suitable part of the optical system of the camera is moved to compensate the movement of the camera caused by e.g. a hand-shake or tremor. A suitable part of the optical system to be adjusted could be the image sensor chip or the lens barrel, which could be moved as well. The image sensor or the lens barrel of the camera will be moved by two or more bi-directional linear motors. The actual position of the camera is controlled by a number of position sensors. The number of position sensors corresponds to the number of linear motors deployed. The image sensor or the lens barrel can be moved on an x-y table in x-y directions perpendicular to the optical axis of the camera. The linear motors itself, moving the image sensor or the lens barrel, can be used to sense the position of the part of the optical system to be adjusted. An x-y table is used carrying the image sensor or the lens barrel. The motors are linked to the x-y table if the image sensor is to be adjusted in case the lens barrel is used the linear motors can be linked to the lens barrel at any suitable position.

Figure 1:
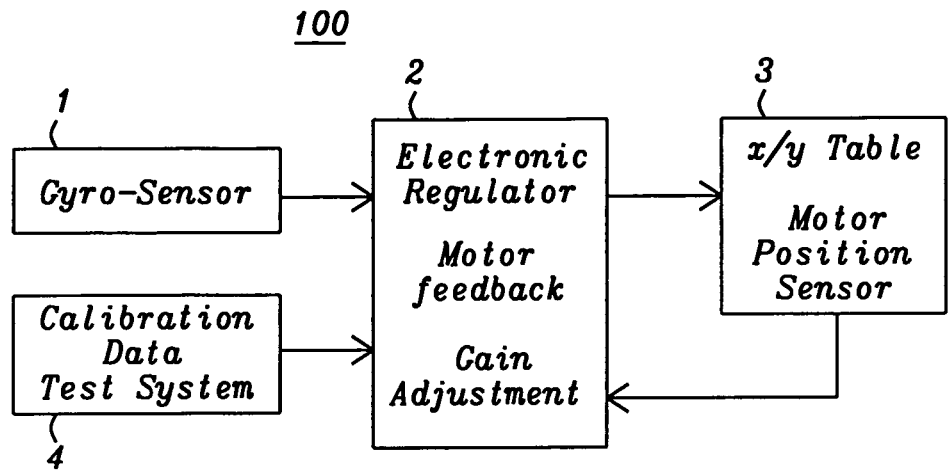
FIG. 1 shows a schematic block diagram of a preferred embodiment of the present invention.

FIG. 1 shows a schematic block diagram of a preferred embodiment of the system invented. The system 100 comprises a gyroscopic sensor 1 to detect movements of the camera. The gyroscopic sensor 1 can be activated any time before a picture is taken.

In a preferred embodiment a gyroscopic sensor 1 is used to detect the movement of the camera. A gyroscopic sensor converts any change of its position into a correspondent voltage corresponding upon an angular speed. Other types of sensors detecting a positional change could be used as well. The output of the gyroscopic sensor 1 is an input for an electronic regulator 2. The output of the electronic regulator 2 is the input of block 3 comprising in a preferred embodiment an x-y table, which carries the image sensor or the lens barrel of the camera, which can be driven in x-y directions, perpendicular to the optical axis, by linear motors, wherein the actual x-y positions of the table is sensed by position sensors. The motors can be directly linked to the lens barrel at any suitable position if the lens barrel is to be moved. In a first embodiment of the invention the position sensing is integrated in linear motors moving the x-y table carrying the sensor chip or the lens barrel. In a second embodiment capacitive position sensors are used, other types of sensors as e.g. Hall sensors, or inductive sensors could be alternatively used. At least two bi-directional linear motors are required to move the x-y table or the lens barrel into a direction required.

The output of the position sensors is fed back to regulator 2 in order to assure that the target position, dependent upon the output of the gyroscopic sensor, is reached.

Furthermore a test and calibration system 4 provides calibration data to the regulator 2. The test and calibration system 4 is used only during assembly of system 100 and it is not delivered with the camera. Calibration data is sent from the calibration system 4 to the regulator 2. The calibration data is used for gain adjustment of the regulator 2, i.e. to adjust the signals to the x-y table of block 3 to the input signals from the gyroscopic sensor 1.

The calibration data, i.e. the gain adjustment data, can be stored in a flash memory, EPROM or EEPROM or any other non-volatile memory. Each camera or camera type can be calibrated in an individual way. Due to production tolerances each camera may have to be calibrated.

Figure 2A:
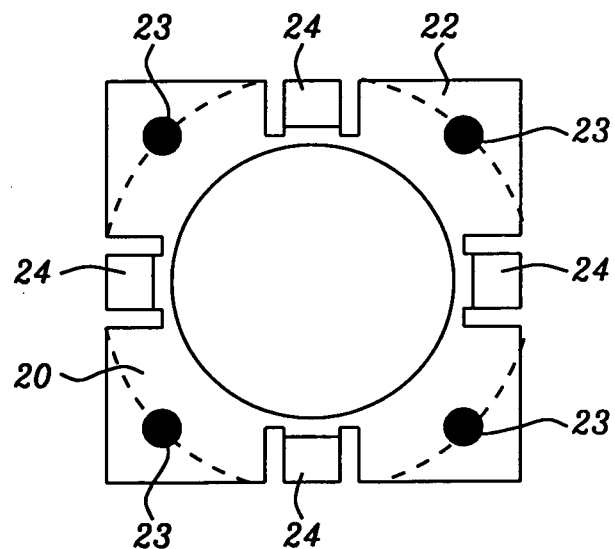
FIG. 2a shows a top view of a top movable plate of an x-y table comprising two plates, a top movable plate and a fixed position bottom plate.

The x-y table comprises two plates, a top movable plate 20 and a fixed position bottom plate 23. FIG. 2a shows a top view of the top movable plate 20. The border of the image sensor or of the lens barrel is indicated by circle 22. For the sake of simplicity the image sensor or lens barrel is indicated only by circle 22. Four balls 23 are carrying the top plate 20 and allow an x-y movement of the top plate 20. Rolling bearings could be used alternatively for the balls. Any other suitable number of balls could alternatively be used. In a preferred embodiment four linear motors 24 are used to move the top movable plate 20. The balls 23, supporting the movement of the x-y top plate, are made of non-magnetic metallic material. At least two bi-directional linear motors are required for the system invented. Other non-magnetic material could alternatively be used for the balls as well.

Figure 2B:
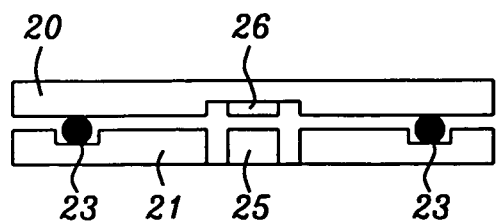
FIG. 2b shows a lateral view of the system invented for image stabilization, namely the movable upper plate and a fixed lower plate.

FIG. 2b shows a lateral view of the system invented for image stabilization. FIG. 2b shows the movable upper plate 20 and a fixed lower plate 21. A linear motor is shown comprising at least one coil 25 wrapped around iron, fastened on the fixed lower plate 21, and magnetic iron 26, fastened on the movable upper plate 20. Two coils per linear motor are required if position sensing is performed by the linear motor itself. An actual position of the magnetic iron 26, which is fastened on the top plate, can be sensed by measuring a difference of inductance between both coils. Capacitive position sensors or inductive position sensors can be used alternatively.

The iron of the coil 25 and of the magnet 26 closes a magnetic loop. The magnetic force is big enough that no additional spring or other means is required to hold the lower and upper plated together. The placement of the linear motors and specifically of the coils and magnets can performed in a multitude of different ways. Furthermore FIG. 2b shows two of the balls 23, supporting the movable upper plate 20 and allowing any movement perpendicular to the optical axis. In a preferred embodiment of the invention noise suppression is performed in the control loop of the position control of the x-y table because the linear motors/actuators have a property of integrators.

Figure 3:
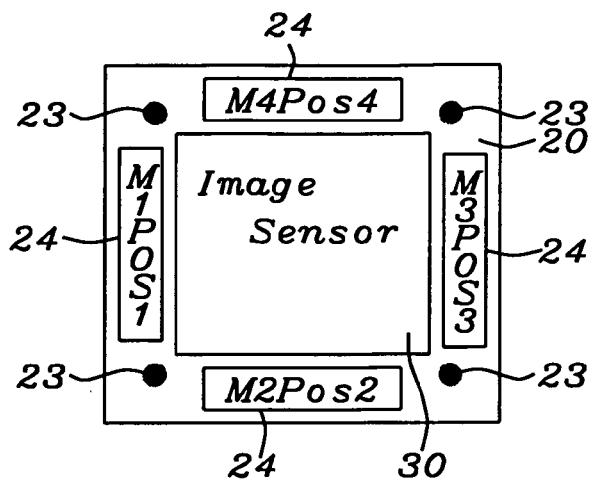
FIG. 3 shows another top view of a top plate of the x-y table.

FIG. 3 shows another top view of top plate 20. The square in the middle indicates an image sensor 30, which is connected via flexible electrical connections to the fixed part of the camera. Alternatively the x-y table could be carrying a lens barrel. Four motors 24 having each a position sensor and four balls 23 are deployed. The position sensing could be performed by Hall sensors, capacitive or inductive sensors, which could be integrated in these motors using two coils as outlined above. It should be noted that at least two bi-directional motors and two related position sensors are required to move the movable plate in any angle to compensate unintentional movements of the camera. Using alternatively three balls is also possible but, depending upon the geometry of the camera, using four balls is the best solution in most cases.

In case position sensors, which are not integrated in the motors, are used they can be located in any suitable positions, i.e. where a movement of the x-y table can be detected.

Using two motors only would require an additional computational effort to calculate a target position of the movable plate by the regulator. The benefit of using two or three motors would be a relative simple mechanical implementation. Also more than four motors could be used requiring additional mechanical and computational effort.

Figure 4A:
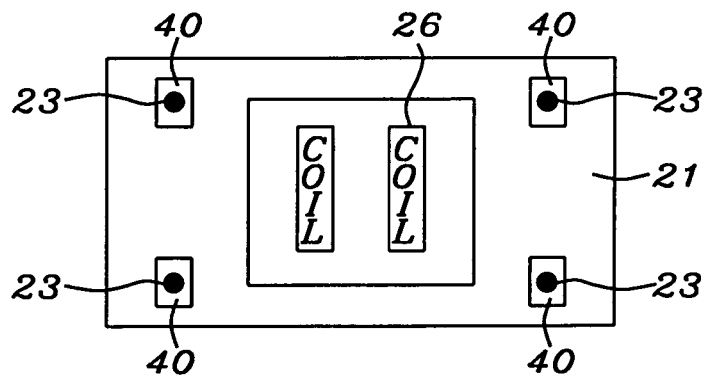
FIG. 4a shows a top view of a lower plate of the x-y table.

FIG. 4a shows a top view of a lower plate 21 of the x-y table having in a preferred implementation four ball openings containing each one ball 23. The balls are made of non-magnetic material. The ball openings 40 are rectangular to allow movements in any angle. Alternatively the ball areas could have another shape as e.g. a circular shape as well. In an opening 41 are the coils 25 wrapped around iron of the linear motors.

The positions of the coils and magnets could be in any suitable locations. They depend upon the geometry of the camera and mechanical requirements.

Figure 4B:
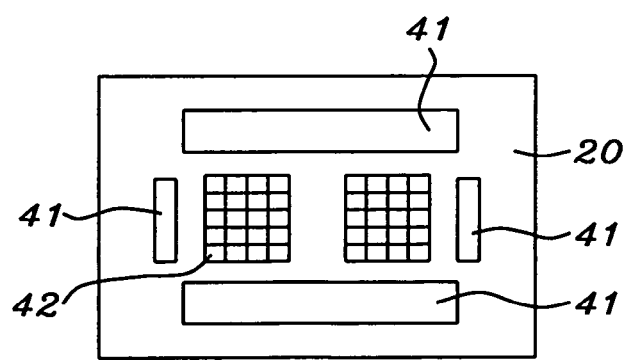
FIG. 4b shows an underside of the movable upper plate with two magnets.

FIG. 4b shows the underside of the movable upper plate 20 of the x-y table with two magnetic irons 42 and tracks 41 for the balls 23. It should be noted that angular movements are possible. It should be noted the upper and lower plate can be interchanged, i.e. any of these plates can be the movable plate while the other plate is the fixed plate.

Figure 6:
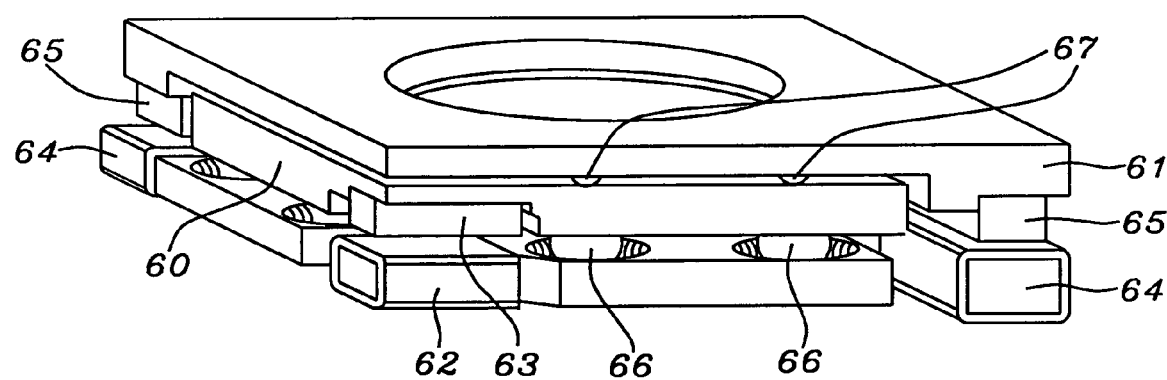
FIG. 6 illustrates another embodiment of the present invention comprising two movable plates.

FIG. 6 illustrates another embodiment of the present invention. This embodiment comprises two movable plates. The first plate 60 can move in x-direction, the second movable plate 61 can move in y-direction or vice versa. Each of both movable plates 60, 61 is driven by one pair of linear motors. A first motor 62 of a first pair of motors is driving, via a magnet 63 fastened on the lower movable plate, the lower movable plate 60. The second motor of the first pair is not visible. The motors 64 of the second pair of motors are driving, each via a magnet 65 fastened on the top movable plate, the top movable plate 65. FIG. 6 shows also two balls 66 guiding the movements of the lower plate 60. The other two balls guiding the lower plate are not visible. Similarly two balls 67 guiding the movements of the top plate 61 are shown. Rolling bearings could be used alternatively for the balls (the other two balls guiding the top plate are not visible). Totally each movable plate is guided by four balls. Another number of balls is also possible.

As outlined above with the other embodiments having one movable plate, the position control can either performed via a position sensing integrated in the motors or by a capacitive, inductive, or by Hall sensors performed position sensing. The lens barrel is firmly connected with both movable plates. Separate gyro sensors and electronic motor regulators are provided for each movable plate.

Figure 5:
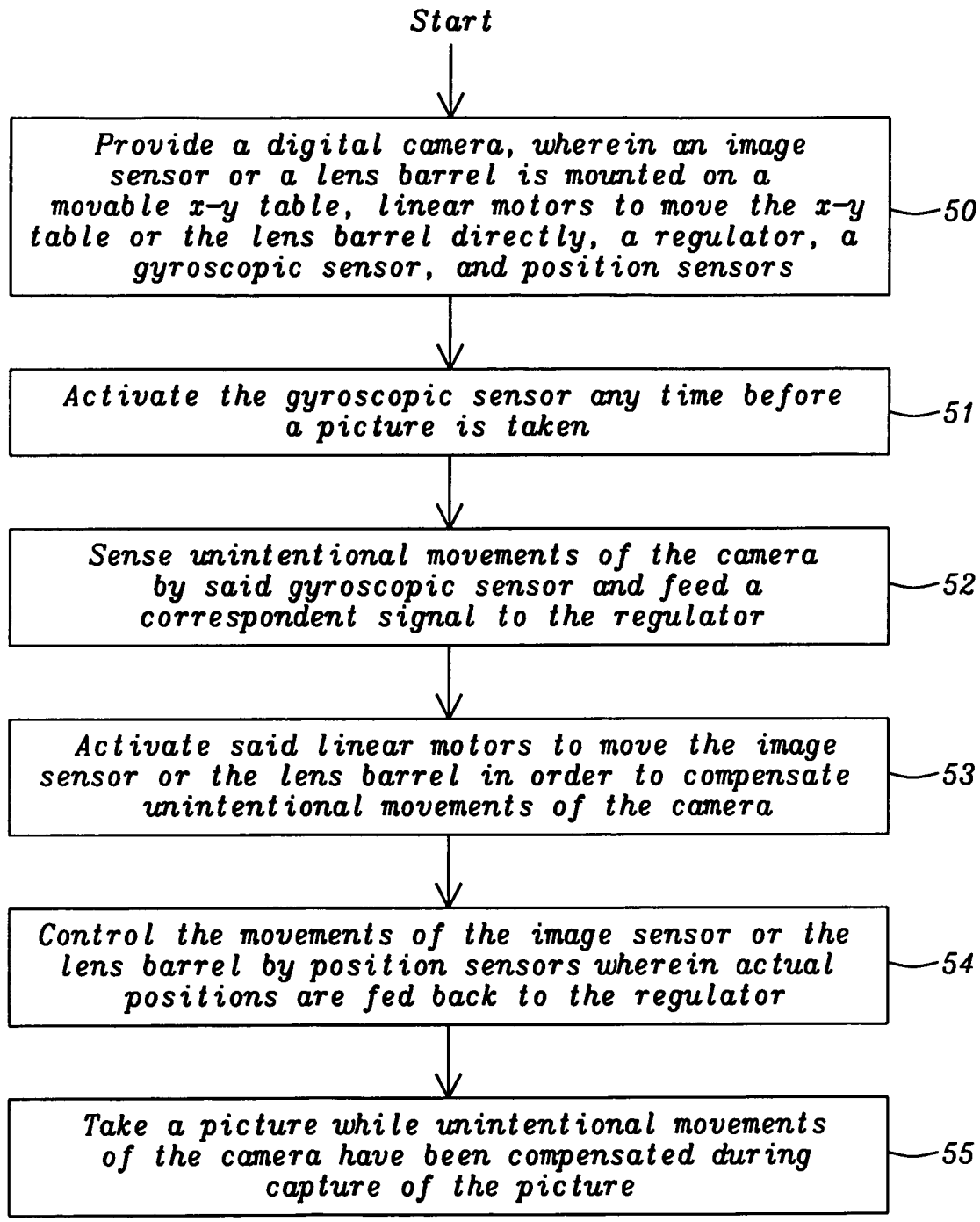
FIG. 5 illustrates a flowchart of a method invented to compensate for unintentional movements of a camera during capture of an image.

FIG. 5 illustrates a flowchart of a method invented to compensate for unintentional movements of a camera during capture of an image. A first step 50 describes the provision of a digital camera, wherein an image sensor or a lens barrel is mounted on a movable x-y table, linear motors to move the x-y table or the lens barrel directly, a regulator, a gyroscopic sensor, and position sensors. A next step 51 illustrates activating the gyroscopic sensor any time before a picture is taken. Step 52 depicts sensing unintentional movements of the camera by said gyroscopic sensor and feed correspondent signals to the regulator. Step 53 illustrates activating said linear motors to move the image sensor or the lens barrel in order to compensate unintentional movements of the camera. Step 54 discloses controlling the movements of the image sensor or the lens barrel by position sensors wherein actual positions are fed back to the regulator. These position sensors can be integrated in the linear motors, or capacitive sensors, inductive sensors or Hall sensors. Step 55 illustrates taking a picture while unintentional movements of the camera have been compensated during capture of the picture at the same time.

While the invention has been particularly shown and described with reference to the preferred embodiments thereof, it will be understood by those skilled in the art that various changes in form and details may be made without departing from the spirit and scope of the invention.

What is claimed is:

1. A system to stabilize images of digital cameras by mechanically adjusting a part of the optical system of the camera to unintentional movements of the camera during capture of an image is comprising:

a gyroscopic sensor, sensing an angle speed of the camera, wherein an output of the gyroscopic sensor is an input to an electronic regulator;

said electronic regulator controlling a position of said part of the optical system, to be adjusted, wherein said part is moved by at least two linear motors dependent upon the input from said gyroscopic sensor, and, wherein position sensors are providing information about an actual position to the electronic regulator;

wherein each of said first parts of each of said linear motors comprises magnetic material and each of said second parts comprises one or more coils wrapped around magnetic material;

wherein a second coil wrapped around said magnetic material is used for position sensing by measuring a difference of inductance between both coils;

an x-y table carrying said part of the optical system to be adjusted, comprising a movable first plate and a fixed second plate, wherein first parts of the linear motors are mounted to the first plate and second parts are mounted to the fixed second plate; and said position sensors providing input to said electronic regulator.

2. The system of claim 1 wherein said first plate can be moved over the fixed second plate using balls.

3. The system of claim 2 wherein said balls are made of non-magnetic material.

4. The system of claim 2 wherein three balls are used.

5. The system of claim 2 wherein four or more balls are used.

6. The system of claim 2 wherein tracks for the balls are provided on the bottom side of the first plate.

7. The system of claim 4 wherein said first part of each of the linear motors is mounted to the first plate and said second part is mounted to the second plate.

8. The system of claim 1 wherein four or more linear motors are used.

9. The system of claim 1 wherein three linear motors are used.

10. The system of claim 1 wherein said position sensors are Hall sensors.

11. The system of claim 1 wherein said position sensors are inductive sensors.

12. The system of claim 1 wherein said position sensors are capacitive sensors.

13. The system of claim 1 wherein the number of said position sensors corresponds to the number of said linear motors.

14. The system of claim 1 wherein a test system provides gain adjustment data during an assembly of said system, wherein said gain adjustment data are stored in a memory of said electronic regulator.

15. The system of claim 1 wherein noise suppression is performed in control loops between said position sensors and said linear motors.

16. The system of claim 1 wherein said gyroscopic sensor can be activated any time before a picture is taken.

17. The system of claim 1 wherein tracks on the bottom side of the top plate are provided to guide the balls.

18. The system of claim 1 wherein said part of the optical system of the camera to be adjusted is an image sensor.

19. The system of claim 18 wherein the linear motors are linked to the x-y table.

20. The system of claim 1 wherein said part of the optical system of the camera to be adjusted is a lens barrel.

21. The system of claim 1 wherein the linear motors are linked to the lens barrel.

22. A method to stabilize images of digital cameras by adjusting a part of the optical system of the camera to unintentional movements of the camera during capture of an image, comprising the following steps:

(1) providing a digital camera, wherein the part of the optical system of the 5 camera to be adjusted is fastened firmly on one or more movables plates of a x-y table, wherein, if more than one plate is used, each plate can move in one dedicated direction, linear motors to move each plate separately, a regulator controlling said motors, a gyroscopic sensor, and position sensors for each plate;

(2) providing first parts of each of said linear motors comprising magnetic material and said second part comprising one or more coils wrapped around magnetic material;

(3) providing a second coil wrapped around said magnetic material to be used for said position sensing by measuring a difference of inductance between both coils;

(4) activating said one or more gyroscopic sensors any time before a picture 10 is taken;

(5) sensing unintentional movements of the camera by said gyroscopic sensor and feed correspondent signals to the regulator;

(6) activating said linear motors to move said one or more plates in order to compensate unintentional movements of the camera;

(7) controlling the movements of said one or more plates by said position sensors wherein actual positions of the plates are fed back to the regulator; and (8) taking a picture while unintentional movements of the camera have been compensated during capture of the picture at the same time.

23. The method of claim 22 further comprising guiding the movements of said one or more movable plates by rolling bearings.

24. The method of claim 23 further comprising guiding the movements of the plates by balls.

25. The method of claim 22 further comprising providing one movable plate only.

26. The method of claim 25 further comprising using three or more linear motors to move the plate.

27. The method of claim 22 further comprising using two linear motors for each plate.

28. The method of claim 11 further comprising integrating said position sensors in the linear motors.

29. The method of claim 22 further comprising providing Hall sensors for said position sensors.

30. The method of claim 22 further comprising providing inductive sensors for said position sensors.

31. The method of claim 22 further comprising providing capacitive sensors for said position sensors.

32. The method of claim 22 further comprising having the number of said position sensors corresponding to the number of said linear motors.

33. The method of claim 22 further comprising providing an image sensor as said part of the optical system of the camera to be adjusted.

34. The method of claim 22 further comprising providing linear motors are linked to the x-y table.

35. The method of claim 22 further comprising providing a lens barrel as said part of the optical system of the camera to be adjusted.

36. The method of claim 35 further comprising providing the linear motors linked to the lens barrel.

37. A system to stabilize images of digital cameras by mechanically adjusting a part of the optical system of the camera to unintentional movements of the camera during capture of an image is comprising:

a gyroscopic sensor, sensing an angle speed of the camera, wherein an output 5 of the gyroscopic sensor is an input to an electronic regulator;

said electronic regulator controlling a position of said part of the optical system, to be adjusted, wherein said part is moved by at least two linear motors dependent upon the input from said gyroscopic sensor, and wherein position sensors are providing information about an actual position of said part of the optical system to the electronic regulator;

a x-y table carrying said part of the optical system to be adjusted, comprising more than one movable plates and a fixed plate, wherein first parts of the linear motors are mounted to the fixed plate and second parts are mounted to each of the movable plates; and said position sensors providing input to said electronic regulator.

38. The system of claim 37 wherein said movable plates can be moved over the fixed second plate guided by roller bearings.

39. The system of claim 38 wherein said roller bearings are ball bearings.

40. The system of claim 39 wherein each movable plate is guided by four balls.

41. The system of claim 39 wherein tracks for the balls are provided on the bottom side of each movable plate.

42. The system of claim 37 wherein two of said linear motors are provided for each of said movable plates, wherein the first parts of the motors are mounted on the fixed plate and two of the second parts of the motors are mounted on each of the movable plates.

43. The system of claim 37 wherein each of said first parts of each of said linear motors comprises magnetic material, and each of said second parts comprises one or more coils wrapped around magnetic material.

44. The system of claim 43 wherein a second coil wrapped around said magnetic material is used for position sensing by measuring a difference of inductance between both coils.

45. The system of claim 37 wherein said position sensors are Hall sensors.

46. The system of claim 37 wherein said position sensors are inductive sensors.

47. The system of claim 37 wherein said position sensors are capacitive sensors.

48. The system of claim 37 wherein the number of said position sensors corresponds to the number of said linear motors.

49. The system of claim 37 wherein a test system provides gain adjustment data during an assembly of said system, wherein said gain adjustment data are stored in a memory of said electronic regulator.

50. The system of claim 37 wherein noise suppression is performed in control loops between said position sensors and said linear motors.

51. The system of claim 37 wherein said gyroscopic sensor can be activated any time before a picture is taken.

52. The system of claim 37 wherein tracks on the bottom side of the moving plates are provided to guide the balls.

53. The system of claim 37 wherein said part of the optical system of the camera to be adjusted is an image sensor.

54. The system of claim 37 wherein the linear motors are linked to the x-y table.

55. The system of claim 37 wherein said part of the optical system of the camera to be adjusted is a lens barrel.

56. The system of claim 37 wherein the linear motors are linked to the lens barrel.

* * * * *

UNITED STATES PATENT AND TRADEMARK OFFICE
CERTIFICATE OF CORRECTION

PATENT NO.         : 8,711,235 B2
APPLICATION NO.    : 13/068650
DATED              : April 29, 2014
INVENTOR(S)        : Chan Page 1 of 1

It is certified that error appears in the above-identified patent and that said Letters Patent is hereby corrected as shown below:

In the Claims:

In Claim 1,
Col. 6, line 51, between image and comprising, delete "is".
Col. 6, line 61, between said and linear, insert --at least two--.
Col. 6, line 63, between parts and comprises, insert --of said at least two linear motors--.
Col. 6, line 63, between around and magnetic, insert --the--.
Col. 7, line 3, between wherein and first, insert --the--.
Col. 7, line 3, between the and linear, insert --at least two--.
Col. 7, line 4, between and and second, insert --the--.
Col. 7, line 4, between parts and are, insert --of said at least two linear motors--.

In Claim 22,
Col. 7, line 58, between of and x-y, delete "a" and insert --an--.
Col. 7, line 65, between and and second, delete "said".
Col. 7, line 66, between around and magnetic, insert --the--.

In Claim 37,
Col. 8, line 65, before x-y, delete "a" and insert --an--.

In Claim 43,
Col. 9, line 22, between around and magnetic, insert --the--.

Signed and Sealed this
Fifteenth Day of July, 2014

Michelle K. Lee
*Deputy Director of the United States Patent and Trademark Office*